United States Patent
Abbasi et al.

(10) Patent No.: US 9,328,956 B2
(45) Date of Patent: May 3, 2016

(54) REFRIGERATOR CONTROL SYSTEM AND METHOD

(71) Applicant: General Electric Company, Schenectady, NY (US)

(72) Inventors: Bahman Abbasi, Louisville, KY (US); Keith Wesley Wait, Louisville, KY (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 13/717,800

(22) Filed: Dec. 18, 2012

(65) Prior Publication Data

US 2014/0165632 A1   Jun. 19, 2014

(51) Int. Cl.
*F25B 41/04* (2006.01)
*F25D 29/00* (2006.01)
*F25D 11/02* (2006.01)

(52) U.S. Cl.
CPC ......... *F25D 29/00* (2013.01); *F25B 2600/0253* (2013.01); *F25B 2600/112* (2013.01); *F25D 11/02* (2013.01); *F25D 2700/12* (2013.01); *Y02B 30/741* (2013.01); *Y02B 30/743* (2013.01); *Y02B 40/32* (2013.01)

(58) Field of Classification Search
CPC ...... Y02B 40/32; Y02B 30/741; F25D 29/00; F25D 2700/12; F25D 11/02; F25B 2600/0253
USPC ........... 62/89, 228.4, 203, 131, 180, 179, 187
See application file for complete search history.

(56) References Cited

U.S. PATENT DOCUMENTS

| | | | | |
|---|---|---|---|---|
| 4,481,785 A * | 11/1984 | Tershak | ................ | F25D 21/006 62/153 |
| 4,481,787 A * | 11/1984 | Lynch | .................... | F25D 11/02 236/46 R |
| 4,843,833 A * | 7/1989 | Polkinghorne | ................. | 62/180 |
| 5,711,159 A * | 1/1998 | Whipple, III | ..................... | 62/82 |
| 5,778,694 A * | 7/1998 | Jeong | ............................. | 62/187 |
| 5,921,104 A * | 7/1999 | Chang | ...................... | F24F 9/00 62/407 |
| 6,047,554 A * | 4/2000 | Choi | ............................. | 62/154 |
| 6,694,754 B1 * | 2/2004 | Schenk et al. | .................. | 62/156 |
| 6,725,680 B1 * | 4/2004 | Schenk et al. | .................. | 62/186 |
| 6,769,265 B1 * | 8/2004 | Davis et al. | .................. | 62/228.4 |
| 6,772,601 B1 * | 8/2004 | Davis et al. | ..................... | 62/187 |
| 6,789,392 B1 * | 9/2004 | Miller et al. | .................... | 62/130 |
| 7,765,819 B2 * | 8/2010 | Anell et al. | ..................... | 62/186 |
| 2002/0088238 A1 * | 7/2002 | Holmes et al. | .................. | 62/155 |

(Continued)

FOREIGN PATENT DOCUMENTS

EP   2 386 812 A2   11/2011
WO   WO 2010134702 A2 *  11/2010

*Primary Examiner* — Cassey D Bauer
*Assistant Examiner* — Kirstin Oswald
(74) *Attorney, Agent, or Firm* — Dority & Manning (57) ABSTRACT

A control system for operating a refrigerator appliance is provided. The refrigerator has a variable damper, a variable speed fan, and a variable speed compressor. The damper position, evaporator fan speed, and compressor speed are determined through interacting feedback control loops based on the set point temperatures for the fresh food and freezer compartments as well as the measured temperatures in such compartments. The adjustment of these actuators can eliminate large temperature fluctuations and discontinuities in the air flow and improve the thermal performance and energy efficiency of the refrigerator.

20 Claims, 4 Drawing Sheets

(56) References Cited

U.S. PATENT DOCUMENTS

| | | | |
|---|---|---|---|
| 2003/0029178 A1* | 2/2003 | Zentner et al. | 62/186 |
| 2003/0182951 A1* | 10/2003 | Rafalovich et al. | 62/154 |
| 2003/0182952 A1* | 10/2003 | Brooke | 62/180 |
| 2003/0182957 A1* | 10/2003 | Hu et al. | 62/228.4 |
| 2006/0260335 A1* | 11/2006 | Montuoro et al. | 62/236 |
| 2007/0012054 A1* | 1/2007 | Schenk et al. | 62/208 |
| 2007/0012055 A1* | 1/2007 | Schenk et al. | 62/208 |
| 2007/0119193 A1* | 5/2007 | Davis | F25C 5/005 62/135 |
| 2008/0190125 A1* | 8/2008 | Yoshioka et al. | 62/208 |
| 2008/0221740 A1* | 9/2008 | Boer et al. | 700/300 |
| 2010/0011801 A1* | 1/2010 | Ritchie et al. | 62/441 |
| 2011/0192187 A1* | 8/2011 | Matsumoto | 62/470 |

\* cited by examiner

REFRIGERATOR CONTROL SYSTEM AND METHOD

FIELD OF THE INVENTION

The subject matter of the present invention relates to a control system for operating a refrigeration appliance.

BACKGROUND OF THE INVENTION

A commonly available design for a refrigeration appliance, particularly one for consumer use, includes a cabinet that contains a freezer compartment and a fresh food compartment. These compartments may be arranged e.g., side by side or may include one over the other. In one example of a conventional design, the evaporator portion of a refrigeration loop is positioned in the freezer compartment where a fan moves air in the freezer compartment across the evaporator to freeze the contents of the freezer compartment. A damper positioned between the freezer compartment and the fresh food compartment is used to feed a portion of the air over to the fresh food compartment for cooling its contents. Typically, the damper is moved between a fully open or fully closed position.

To control the refrigeration loop that provides cooling for the refrigerator, one previous approach has been the use of a single thermostat such as e.g., a bimetallic thermostat. The compressor is cycled on or off based on the temperature of the thermostat. Among several drawbacks to this approach is that the measurement of temperature is limited to a single location within the appliance, which can lead to undesirable temperature gradients within the compartments. Another drawback is that repeated cycling of the compressor and/or evaporator fan between on and off states typically results in large temperature swings and intermittencies in air flow, which in turn also causes poor humidity control.

A more modern approach to control includes the use of refrigerators having microcontrollers that execute a wide variety of various algorithms for temperature control of the appliance. For many of these algorithms, the available actuators for the control system are used as either binary state devices (on/off) or sometimes as quaternary state devices (off/low/medium/high). For example, a fan for the evaporator would either be in an "on" or "off" state. A damper would be either fully shut or fully closed. As such, the effectiveness of these control systems and their respective algorithms is limited by operating in such finite states rather than in continuous actuation.

Therefore, a control system for a refrigerator appliance would be useful. More particularly, a control system for a refrigerator that can use temperature measurements from e.g., both the freezer and fresh food compartments would be useful. Such a control system that can provide for continuous adjustment of multiple actuators (e.g., the compressor, damper, and evaporator fan) to more accurately regulate the temperature in the fresh food and freezer compartments would be beneficial. Such a control system that can operate the refrigerator appliance in a more energy efficient manner would also be useful.

BRIEF DESCRIPTION OF THE INVENTION

The present invention provides a control system for operating a refrigerator appliance. The refrigerator has a variable damper, a variable speed fan, and a variable speed compressor. The damper position, evaporator fan speed, and compressor speed are determined through interacting feedback control loops based on the set point temperatures for the fresh food and freezer compartments as well as the measured temperatures in such compartments. The adjustment of these actuators can eliminate large temperature fluctuations and discontinuities in the air flow and improve the thermal performance and energy efficiency of the refrigerator. Additional aspects and advantages of the invention will be set forth in part in the following description, or may be apparent from the description, or may be learned through practice of the invention.

In one exemplary aspect, the present invention provides a method of operating a refrigerator appliance that includes a fresh food compartment, a freezer compartment, an evaporator, a variable speed evaporator fan for moving air over the evaporator, a variable damper for controlling the flow of air from the freezer compartment to the fresh food compartment, and a variable speed compressor. The method includes the steps of providing a set point temperature, FF SP, for the fresh food compartment; providing a set point temperature, FZ SP, for the freezer compartment; measuring FF THERM, the temperature of the fresh food compartment; measuring FZ THERM, the temperature of the freezer compartment; determining FF ERR, the fresh food compartment temperature error, using FF SP and FF THERM; determining FZ ERR, the freezer food compartment temperature error, using FZ SP and FZ THERM; using FF ERR to determine the fresh food compartment demand for cold air, $q_{FF}$; using FZ ERR to determine the freezer compartment demand for cold air, $q_{FZ}$; setting the speed of the evaporator fan based on $q_{FF}+q_{FZ}$, the sum of the fresh food compartment demand for cold air and the freezer compartment demand for cold air; setting the position of the damper based on $q_{FF}/(q_{FF}+q_{FZ})$, the fraction of the total demand for cold air of the fresh food compartment; and setting the speed of the compressor based on a combination of FF ERR and FZ ERR.

In another exemplary embodiment, the present invention provides a refrigerator appliance that includes a fresh food compartment; a freezer compartment; an evaporator, a variable speed evaporator fan for moving air over the evaporator, the evaporator fan adjustable between a minimum speed and multiple non-zero speeds; a variable damper for controlling the flow of air from the freezer compartment to the fresh food compartment, the variable damper selectively adjustable between a closed position and multiple open positions; a variable speed compressor, and a control system.

For this exemplary embodiment, the control system includes a first control loop configured for controlling the speed of the evaporator fan in response to FZ ERR, an error term based on a set point temperature, FZ SP, for the freezer compartment and FZ THERM, the temperature of the freezer compartment. The control system also includes a second control loop configured for controlling the position of the variable damper in response to FF ERR, an error term based on a set point temperature, FF SP, for the fresh food compartment and FF THERM, the temperature of the fresh food compartment. The control system also includes a third control loop configured for controlling the speed of the compressor as a function of both the first control loop and the second control loop.

In another exemplary embodiment, the present invention provides a refrigerator appliance that includes a fresh food compartment; a freezer compartment; an evaporator; a variable speed evaporator fan for moving air over the evaporator, the evaporator fan adjustable between a minimum speed and multiple non-zero speeds; a variable damper for controlling the flow of air from the freezer compartment to the fresh food compartment, the variable damper selectively adjustable between a closed position and multiple open positions; a variable speed compressor, and one or more controllers.

For this embodiment, the one or more controllers are configured for receiving measurements of FF THERM, the temperature of the fresh food compartment; receiving measurements of FZ THERM, the temperature of the freezer compartment; determining FF ERR, the fresh food compartment temperature error, using FF THERM and the fresh food compartment set point temperature, FF SP; determining FZ ERR, the freezer compartment temperature error, using FZ THERM and the freezer compartment set point temperature, FZ SP; using FF ERR to determine the fresh food compartment demand for cold air, $q_{FF}$; using FZ ERR to determine the freezer compartment demand for cold air, $q_{FZ}$; setting the speed of the evaporator fan based on $q_{FF}+q_{FZ}$, the sum of the fresh food compartment demand for cold air and the freezer compartment demand for cold air; setting the position of the damper based on $q_{FF}/(q_{FF}+q_{FZ})$, the fraction of the total demand for cold air of the fresh food compartment; and setting the speed of the compressor based on a combination of FF ERR and FZ ERR.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
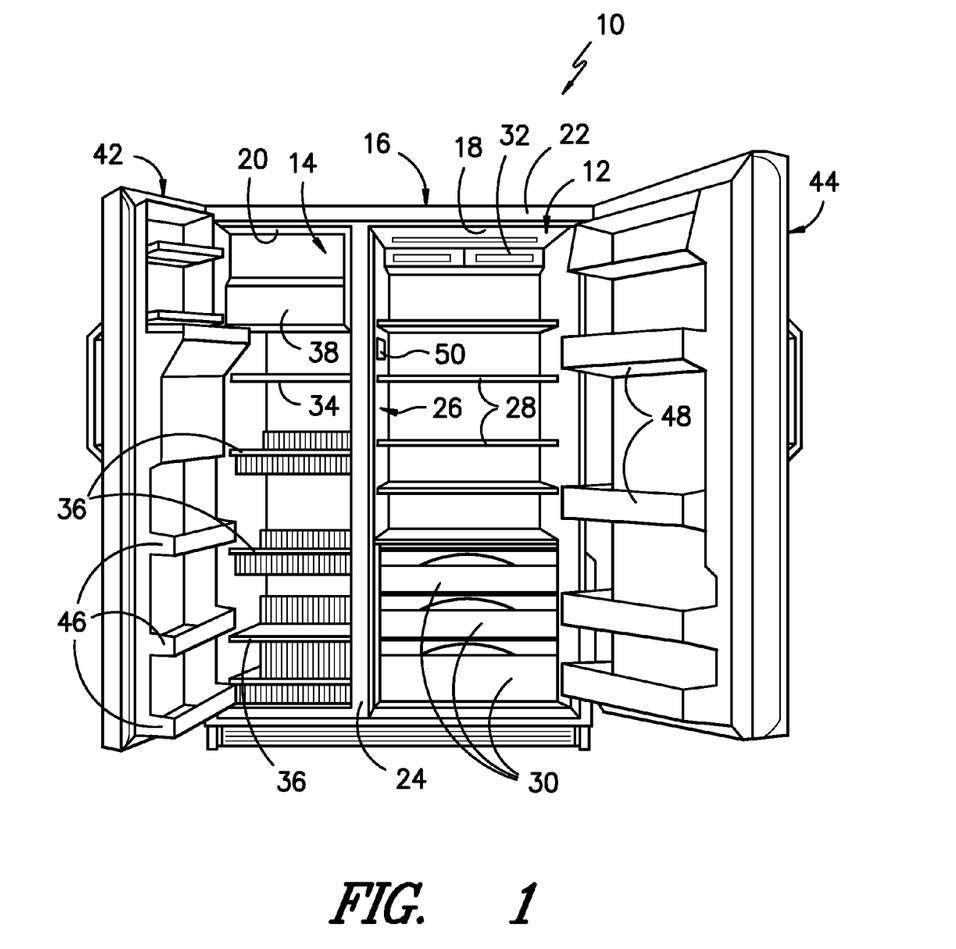
FIG. 1 provides an exemplary embodiment of a refrigerator appliance as may be used with the present invention.

FIG. 1 provides a front view of a representative refrigerator 10 in an exemplary embodiment of the present invention. More specifically, for illustrative purposes, the present invention is described with a refrigerator 10 having a construction as shown and described further below. As used herein, a refrigerator includes appliances such as a refrigerator/freezer combination, compact, and any other style or model of a refrigerator. Accordingly, other configurations including multiple and different styled compartments could be used with refrigerator 10, it being understood that the configuration shown in FIG. 1 is by way of example only.

Refrigerator 10 includes a fresh food storage compartment 12 and a freezer storage compartment 14. Freezer compartment 14 and fresh food compartment 12 are arranged side-by-side within an outer case 16 and defined by inner liners 18 and 20 therein. A space between case 16 and liners 18 and 20, and between liners 18 and 20, is filled with foamed-in-place insulation. Outer case 16 normally is formed by folding a sheet of a suitable material, such as pre-painted steel, into an inverted U-shape to form the top and side walls of case 16. A bottom wall of case 16 normally is formed separately and attached to the case side walls and to a bottom frame that provides support for refrigerator 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel. The illustrative embodiment includes two separate liners 18, 20 as it is a relatively large capacity unit and separate liners add strength and are easier to maintain within manufacturing tolerances. In smaller refrigerators, a single liner is formed and a mullion 24 spans between opposite sides of the liner to divide it into a freezer compartment and a fresh food compartment.

A breaker strip 22 extends between a case front flange and outer front edges of liners 18, 20. Breaker strip 22 is formed from a suitable resilient material, such as an extruded acrylo-butadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator 10 includes shelves 28 and slide-out storage drawers 30, sometimes referred to as storage pans, which normally are provided in fresh food compartment 12 to support items being stored therein.

Mullion 24 or mullion wall 26 includes a damper 50 that is opened and closed to allow cooler air from the freezer compartment 14 into fresh food compartment 12. In an exemplary embodiment of the present invention, damper 50 is a variable damper 50 meaning that its position can be dynamically adjusted between open and closed as well as all settings in between. For example, damper 50 can be set at 25 percent open, 36 percent open, 64 percent, open, and substantially all other values from 0 percent open to 100 percent open. The position of variable damper 50 can be determined by a sensor and/or e.g., the voltage or current provided to an actuator that operates variable damper 50. The position of the variable damper 50 can be determined by, and communicated to, variable damper 50 by a controller as will now be further described. Other control configurations may be used as well.

Refrigerator 10 can be operated by a controller (not shown) or other processing device according to programming and/or user preference via manipulation of a control interface 32 mounted e.g., in an upper region of fresh food storage compartment 12 and connected with the controller. The controller may include one or more memory devices and one or more microprocessors, such as a general or special purpose microprocessor operable to execute programming instructions or micro-control code associated with the operation of the refrigerator. The memory may represent random access memory such as DRAM, or read only memory such as ROM or FLASH. In one embodiment, the processor executes programming instructions stored in memory. The memory may be a separate component from the processor or may be included onboard within the processor. The controller may include one or more proportional-integral-derivative (PID) controllers programmed, equipped, or configured to operate the refrigerator appliance according to exemplary aspects of the control method set forth herein.

The controller may be positioned in a variety of locations throughout refrigerator 10. In the illustrated embodiment, the controller may be located e.g., behind an interface panel 32 or doors 42 or 44. Input/output ("I/O") signals may be routed between the control system and various operational components of refrigerator 10 along wiring harnesses that may be routed through e.g., the back, sides, or mullion 26. Typically, through user interface panel 32, a user may select various operational features and modes and monitor the operation of refrigerator 10. In one embodiment, the user interface panel may represent a general purpose I/O ("GPIO") device or functional block. In one embodiment, the user interface panel 32 may include input components, such as one or more of a variety of electrical, mechanical or electro-mechanical input devices including rotary dials, push buttons, and touch pads. The user interface panel 32 may include a display component, such as a digital or analog display device designed to provide operational feedback to a user. The user interface panel may be in communication with the controller via one or more signal lines or shared communication busses.

In one exemplary embodiment of the present invention, one or more temperature sensors are provided to measure the temperature FF THERM in the fresh food compartment 12 and the temperature FZ THERM in the freezer compartment 14. This temperature information can be provided, e.g., to the controller for use in operating refrigerator 10 as will be more fully discussed below. These temperature measurements may be taken intermittently or continuously during operation of the appliance and/or execution of a control system as further described below.

A shelf 34 and wire baskets 36 are also provided in freezer compartment 14. In addition, an ice maker 38 may be provided in freezer compartment 14. A freezer door 42 and a fresh food door 44 close access openings to freezer and fresh food compartments 14, 12, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Figure 2:
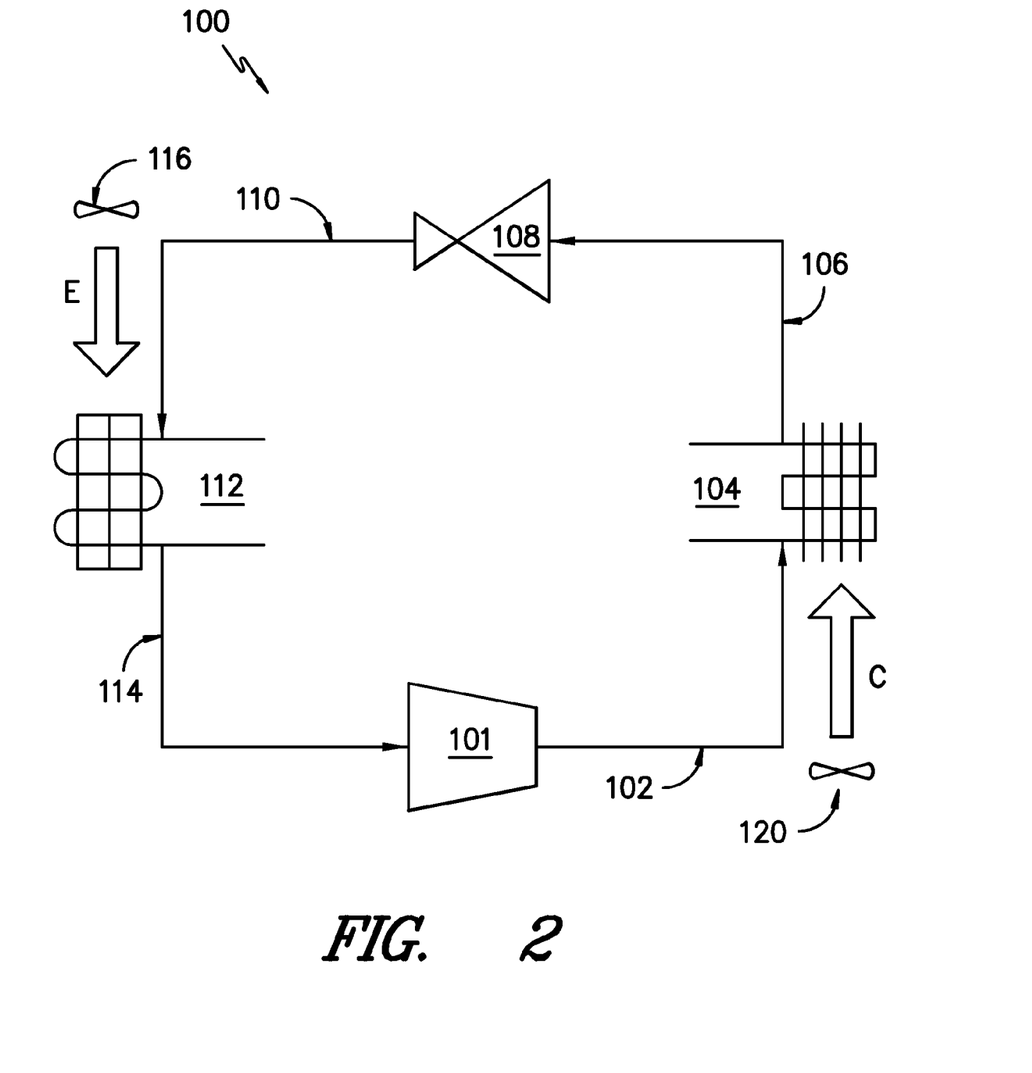
FIG. 2 is a schematic view of an exemplary refrigeration cycle as may be used with the present invention.

Refrigerator 10 includes a machinery compartment that incorporates at least part of the refrigeration cycle 100 shown in FIG. 2. The components of refrigeration cycle 100 include a refrigerant compressor unit 101, a condenser 104, an expansion device 108, and an evaporator 112—all connected in series and charged with a refrigerant. In one exemplary embodiment of the present invention, compressor unit 101 is a variable speed compressor. For example, the speed of compressor unit 101 can be varied between zero and 100 percent by the controller. A compressor with variable speed over other ranges may be used as well. The speed of compressor 101 can be determined by, and communicated to, compressor 101 by the controller.

Evaporator 112 is a type of heat exchanger that transfers heat from air passing over the evaporator 112 to a refrigerant flowing through evaporator 112, thereby causing the refrigerant to vaporize. Evaporator fan 116 is used to force air over evaporator 112 as shown by arrow E. As such, cooled air is produced and configured to refrigerate compartments 12, 14 of refrigerator 10. In one exemplary embodiment of the present invention, fan 116 is a variable speed evaporator fan—meaning the speed of fan 116 may be controlled or set anywhere between and including, for example, 0 and 100 percent. A fan having variable speed over other ranges may be used as well. The speed may be detected by a sensor and/or dynamically controlled through amperage or voltage. The speed of the evaporator fan 116 can be determined by, and communicated to, evaporator fan 116 by the controller. Other control configurations may be used as well.

From evaporator 112, vaporized refrigerant flows to compressor unit 101, which increases the pressure of the refrigerant. This compression of the refrigerant raises its temperature, which is subsequently lowered by passing the gaseous refrigerant through condenser 104 where heat exchange with ambient air takes place so as to cool the refrigerant. Fan 120 is used to force air over the condenser for cooling the refrigerant as depicted by arrow C. Expansion device 108 (depicted in FIG. 2 as a single valve) is used to further reduce the pressure of refrigerant leaving condenser 104 before being fed as a liquid to evaporator 112. The refrigeration cycle 100 depicted in FIG. 2 is provided by way of example only. It is within the scope of the present invention for other configurations of the refrigeration system 100 to be used as well.

In the operation of refrigerator 10, typically a set point temperature is selected for each of the fresh food compartment 12 and freezer compartment 14. These set point temperatures may be e.g., provided by the user through a selection control or provided by the manufacturer as a preset. The set point temperature is the temperature desired for the contents of each compartment 12 and 14 during operation of refrigerator 10. As used herein, FF SP represents the set point temperature for the fresh food compartment 12, and FZ SP represents the set point temperature for the freezer compartment 14.

As part of an exemplary method of the present invention for operating refrigerator appliance 10, a determination is made of FF ERR and FZ ERR. As used herein, FF ERR represents the fresh food compartment 12 temperature error and can be calculated, for example, as the difference in temperature between the FF SP and FF THERM. Similarly, FZ ERR represents the freezer compartment 14 temperature error and can be calculated, for example, as the difference in temperature between FZ SP and FZ THERM.

Using FF ERR, the fresh food compartment 12 demand for cold air, $q_{FF}$, is determined. For example, the controller provides an output $q_{FF}$ that is representative of the fresh food compartment's demand for cold air. Similarly, using FZ ERR, the frozen food compartment 14 demand for cold air, $q_{FZ}$, is determined. For example, the controller provides an output $q_{FZ}$ that is representative of the fresh food compartment's demand for cold air. Using these values, the speed of the evaporator fan 116, the position of the variable damper 50, and the speed of the compressor 101 are determined as now described according to an exemplary aspect of the present invention.

More particularly, the speed of evaporator fan 116 is set by the controller based on the combined demand for cold air from the two compartments 12 and 14, which can be represented as $q_{FF}+q_{FZ}$. The position of the variable damper 50 is set by the controller based on the fraction of the total demand for air of the fresh food compartment 12 demand for air, which can be represented as the fraction or ratio $q_{ff}/(q_{FF}+q_{FZ})$. For example, the controller may provide a signal to the evaporator fan 116 setting its speed and a signal to the variable damper 50 setting its position. As stated above, a signal may also be provided to the controller whereby the correct speed for fan 116 and position for damper 50 may be monitored and/or confirmed.

According to another exemplary aspect of the present invention, the speed of the variable speed compressor 101 is set based on a combination of FZ ERR and FF ERR. For example, the input setting for the speed of the compressor 101 can be a combination of FZ ERR and FF ERR that is determined as follows:

$$((FF\ ERR + FZ\ ERR)/2) + ((FF\ ERR^+ + FZ\ ERR^+)/2) \qquad \text{Eqn. (1)}$$

where:
FF ERR is the fresh food compartment error;
FZ ERR is the freezer compartment error;
FF ERR$^+$ is positive portion of the fresh food compartment error; and
FZ ERR$^+$ is positive portion of the freezer compartment error.

As used herein, positive portion refers to how much warmer the measured temperature is compared to the setpoint temperature. For example, FF ERR$^+$ is equal to FF THERM– FF SP when such is a positive value and is equal to zero if such is a negative value. Similarly, then FZ ERR$^+$ is equal to FZ THERM–FZ SP when such is a positive value and is equal to zero if such is a negative value.

Figure 3:
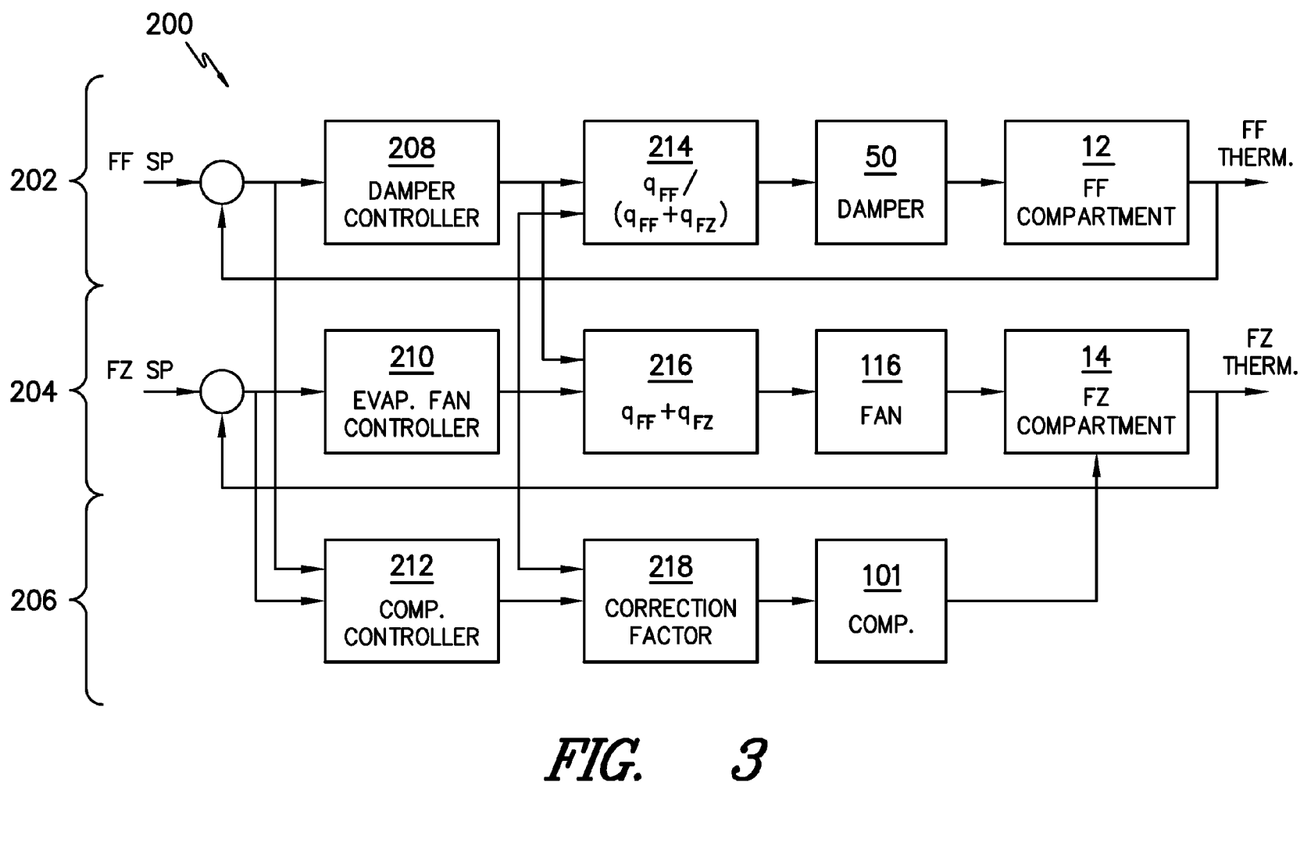
FIG. 3 provides a schematic view of an exemplary control system of the present invention.

FIG. 3 illustrates schematically a control system 200 of the present invention that can be employed as described to control the operation of refrigerator 10. Control system 200 may include control loops 202, 204, and 206 (i.e. feed back control loops) configured as shown with damper controller 208, evaporator fan controller 210, and compressor controller 212. The connecting lines with arrows represent signals between the various components of control system 200 as further described herein. Controllers 208, 210, and 212 may be constructed as a single unit controller or may include one or more separate units.

As shown, control system 200 includes a first control loop 202 (i.e., a feed back control loop) that is configured for controlling the position of the variable damper 50 in response to FF ERR, which is the error term based on FF SP and FF THERM as set forth above. A second control loop 204 is configured for controlling the speed of evaporator fan 116 in response to FZ ERR, which is the error term based on FZ SP and FZ THERM as set forth above. A third control loop 206 is configured for controlling the speed of compressor 212 as a function of both the first control loop 202 and the second control loop 204 as shown.

For this exemplary embodiment, the output of controller 208 is $q_{ff}$, the demand for cold air from fresh food compartment 12—e.g., a signal that represents the cold air needed to cool fresh food compartment 12 from FF THERM to FF SP. The output of controller 210 is $q_{FZ}$, the demand for cold air from freezer compartment 14—e.g., a signal that represents the cold air needed to cool freezer compartment 14 from FZ THERM to FZ SP.

As shown in FIG. 3, the combined demand for cold air from both compartments, denoted as $q_{FZ}+q_{FF}$, determines the speed for variable speed fan 116. The ratio of the demand for cold air for fresh food compartment 12 to the total demand for cold air, denoted as $q_{FF}/(q_{FF}+q_{FZ})$, provides a signal that determines the position of variable damper 50.

FIG. 3 also indicates the use of a correction factor 218, which is applied to the output from compressor controller 212. Without this correction factor 218, temperatures FZ THERM and FF THERM can be maintained. However, it is possible that the temperatures FZ THERM and FF THERM will be maintained with energetically inefficient operating conditions of evaporator fan 116 and compressor 101.

The inventors also discovered that energy consumption can be lowered by modulating the output of the compressor controller 212 with the demand for cold air by the freezer compartment, $q_{FZ}$. With proper design as described herein, $q_{FZ}$ along with other parameters and constraints can be used to maintain the temperatures FZ THERM and FF THERM, provide continuous air flow, and lower energy consumption.

Figure 4:
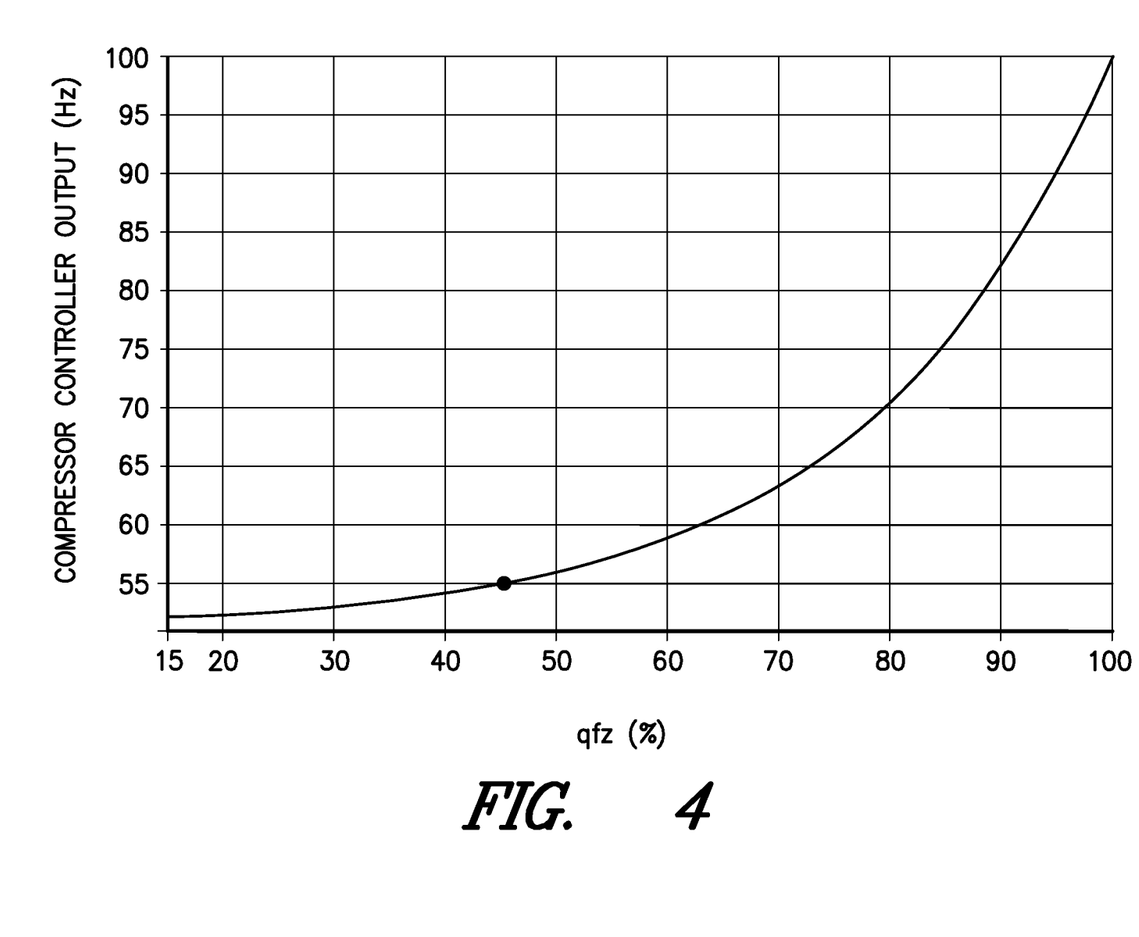
FIG. 4 is a plot, more particularly a correlation, that may be used with the control system as will be further described herein.

Accordingly, and by way of example, the following correlation applies such a correction factor 218 and can be used to calculate the speed of compressor 101.

$$Co = Co_{min} + \exp[b(q_{FZ}-q_{min})] \qquad \text{Eqn. (2)}$$

where
$Co_{min}$ = a minimum compressor speed
$b = (100-q_{min})-1*\ln(Co_{controller}-Co_{min})$
Co controller = compressor controller output
$q_{min}$ = a value of $q_{FZ}$ below which the compressor will shut off until $q_{FZ}$ exceeds $q_{min}$ For example, if $q_{min}$ equals 15 percent, $Co_{min}$ equals 51 Hz, and the compressor controller's output is 100 Hz, the signal that will transmitted to the compressor 101 is determined through the correlation shown in FIG. 4. For example, when $q_{FZ}$ is approximately 45 percent, the actual signal to the compressor 101 will be 55 Hz as opposed to the request of 100 Hz from compressor controller 212.

Other correction factors to modulate the compressor speed may also be used provided such are based on $q_{FZ}$, the demand for cold air by the freezer compartment 12 (which is a combination of the position of variable damper 50 and the speed of fan 116).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance that includes a fresh food compartment, a freezer compartment, an evaporator, a variable speed evaporator fan for moving air over the evaporator, a variable damper for controlling the flow of air from the freezer compartment to the fresh food compartment, and a variable speed compressor, the method comprising the steps of:

providing a set point temperature, FF SP, for the fresh food compartment;

providing a set point temperature, FZ SP, for the freezer compartment;

measuring FF THERM, the temperature of the fresh food compartment;

measuring FZ THERM, the temperature of the freezer compartment;

determining FF ERR, the fresh food compartment temperature error, using FF SP and FF THERM;

determining FZ ERR, the freezer food compartment temperature error, using FZ SP and FZ THERM;

using FF ERR to determine the fresh food compartment demand for cold air, $q_{FF}$;

using FZ ERR to determine the freezer compartment demand for cold air, $q_{FZ}$;

setting the speed of the evaporator fan based on $q_{FF}+q_{FZ}$, the sum of the fresh food compartment demand for cold air and the freezer compartment demand for cold air;

setting the position of the damper based on $q_{FF}/(q_{FF}+q_{FZ})$, the fraction of the total demand for cold air of the fresh food compartment;

setting the speed of the compressor based on a combination of FF ERR and FZ ERR, and a logarithmic correction factor calculated using $q_{FZ}$; and lowering the energy consumption of the refrigerator appliance.

2. The method of operating a refrigerator appliance as in claim 1, wherein the refrigerator appliance further includes a compressor controller, and wherein said step of setting the speed of the compressor comprises the step of:

calculating an input to the compressor controller using a combination of FF ERR and FZ ERR.

3. The method of operating a refrigerator appliance as in claim 2, wherein the combination of FF ERR and FZ ERR for said step of calculating an input to the compressor controller is determined using the following relationship:

$$((FF\ ERR+FZ\ ERR)/2)+((FF\ ERR++FZ\ ERR+)/2)$$

where:

FF ERR is the fresh food compartment error;

FZ ERR is the freezer compartment error;

FF ERR+ is positive portion of the fresh food compartment error; and

FZ ERR+ is positive portion of the freezer compartment error.

4. The method of operating a refrigerator appliance as in claim 1, further comprising the step of calculating FF ERR as FF SP−FF THERM.

5. The method of operating a refrigerator appliance as in claim 1, further comprising the step of calculating FZ ERR as FZ SP−FZ THERM.

6. The method of operating a refrigerator appliance as in claim 1, further comprising the step of calculating the speed of the compressor.

7. The method of operating a refrigerator appliance as in claim 1, further comprising the step of calculating the speed of the compressor, Co, using the following said logarithmic correction factor calculated using $q_{FZ}$:

$$Co=Co_{min}+\exp\ [b(q_{FZ}-q_{min})]$$

where $Co_{min}$=a minimum compressor speed $b=(100-q_{min})^{-1}*\ln(Co_{controller}-Co_{min})$ $Co_{controller}$=compressor controller output $q_{min}$=a value of $q_{FZ}$ below which the compressor will shut off until $q_{FZ}$ exceeds $q_{min}$.

8. A refrigerator appliance, comprising:

a fresh food compartment;

a freezer compartment;

an evaporator, a variable speed evaporator fan for moving air over the evaporator, the evaporator fan adjustable between a minimum speed and multiple non-zero speeds;

a variable damper for controlling the flow of air from the freezer compartment to the fresh food compartment, the variable damper selectively adjustable between a closed position and multiple open positions;

a variable speed compressor; and a control system comprising a first control loop configured for controlling the speed of the evaporator fan in response to FZ ERR, an error term based on a set point temperature, FZ SP, for the freezer compartment and FZ THERM, the temperature of the freezer compartment;

a second microcontrol circuit configured for controlling the position of the variable damper in response to FF ERR, an error term based on a set point temperature, FF SP, for the fresh food compartment and FF THERM, the temperature of the fresh food compartment; and a third control loop configured for controlling the speed of the compressor as a function of both the first microcontroller circuit and the second microcontroller circuit, and said third microcontroller circuit further comprising a logarithmic correction factor calculated using the freezer compartment demand for cold air, $q_{FZ}$.

9. The refrigerator appliance of claim 8, wherein FZ ERR is related to the difference between FZ SP and FZ THERM.

10. The refrigerator appliance of claim 8, wherein FF ERR is related to the difference between FF SP and FF THERM.

11. The refrigerator appliance of claim 8, wherein the first microcontroller circuit is further configured for controlling the speed of the evaporator fan based on demand for cold air by the freezer compartment and the fresh food compartment.

12. The refrigerator appliance of claim 8, wherein the second microcontroller circuit is further configured for controlling the position of the damper based on a ratio of demand for cold air by the fresh food compartment to a sum of the demand for cold air by the fresh food compartment and demand for cold air by the freezer compartment.

13. The refrigerator appliance of claim 8, wherein the third microcontroller circuit is further configured for calculating the speed of the compressor based on variables including a minimum compressor speed and demand for cold air by the freezer compartment.

14. The refrigerator appliance of claim 8, further configured for calculating the speed of the compressor, Co, using the following said logarithmic correction factor calculated using $q_{FZ}$:

$$Co=Co_{min}+\exp\ [b(q_{FZ}-q_{min})]$$

where $Co_{min}$=a minimum compressor speed $b=(100-q_{min})^{-1}*\ln(Co_{controller}-Co_{min})$ $Co_{controller}$=compressor controller output $q_{min}$=a value of $q_{FZ}$ below which the compressor will shut off until $q_{FZ}$ exceeds $q_{min}$.

15. The refrigerator appliance of claim 8, wherein the minimum speed of the evaporator fan is about zero.

16. A refrigerator appliance, comprising:

a fresh food compartment;

a freezer compartment;

an evaporator;

a variable speed evaporator fan for moving air over the evaporator, the evaporator fan adjustable between a minimum speed and multiple non-zero speeds;

a variable damper for controlling the flow of air from the freezer compartment to the fresh food compartment, the variable damper selectively adjustable between a closed position and multiple open positions;

a variable speed compressor;

one or more controllers configured for receiving measurements of FF THERM, the temperature of the fresh food compartment;

receiving measurements of FZ THERM, the temperature of the freezer compartment;

determining FF ERR, the fresh food compartment temperature error, using FF THERM and the fresh food compartment set point temperature, FF SP, determining FZ ERR, the freezer compartment temperature error, using FZ THERM and the freezer compartment set point temperature, FZ SP, using FF ERR to determine the fresh food compartment demand for cold air, $q_{FF}$;

using FZ ERR to determine the freezer compartment demand for cold air, $q_{FZ}$;

setting the speed of the evaporator fan based on $q_{FF}+q_{FZ}$, the sum of the fresh food compartment demand for cold air and the freezer compartment demand for cold air;

setting the position of the damper based on $q_{FF}/(q_{FF}+q_{FZ})$, the fraction of the total demand for cold air of the fresh food compartment;

setting the speed of the compressor based on a combination of FF ERR FZ ERR, and a logarithmic correction factor calculated using $q_{FZ}$, and lowering the energy consumption of the refrigerator appliance.

17. A refrigerator appliance as in claim 16, wherein the one or more controllers are further configured for calculating a signal to control the compressor that is based on a combination of FF ERR and FZ ERR.

18. A refrigerator appliance as in claim 17, wherein the combination of FF ERR and FZ ERR is determined using the following relationship:

((FF ERR+FZ ERR)/2)+((FF ERR++FZ ERR+)/2)

where:

FF ERR is the fresh food compartment error;

FZ ERR is the freezer compartment error;

FF ERR+ is positive portion of the fresh food compartment error; and

FZ ERR+ is positive portion of the freezer compartment error.

19. A refrigerator appliance as in claim 16, wherein FF ERR is determined as FF SP−FF THERM.

20. A refrigerator appliance as in claim 19, wherein FZ ERR is determined as FZ SP−FZ THERM.

* * * * *